July 21, 1936.　　　E. E. HEWITT　　　2,048,337
FLUID PRESSURE BRAKE
Filed April 6, 1932
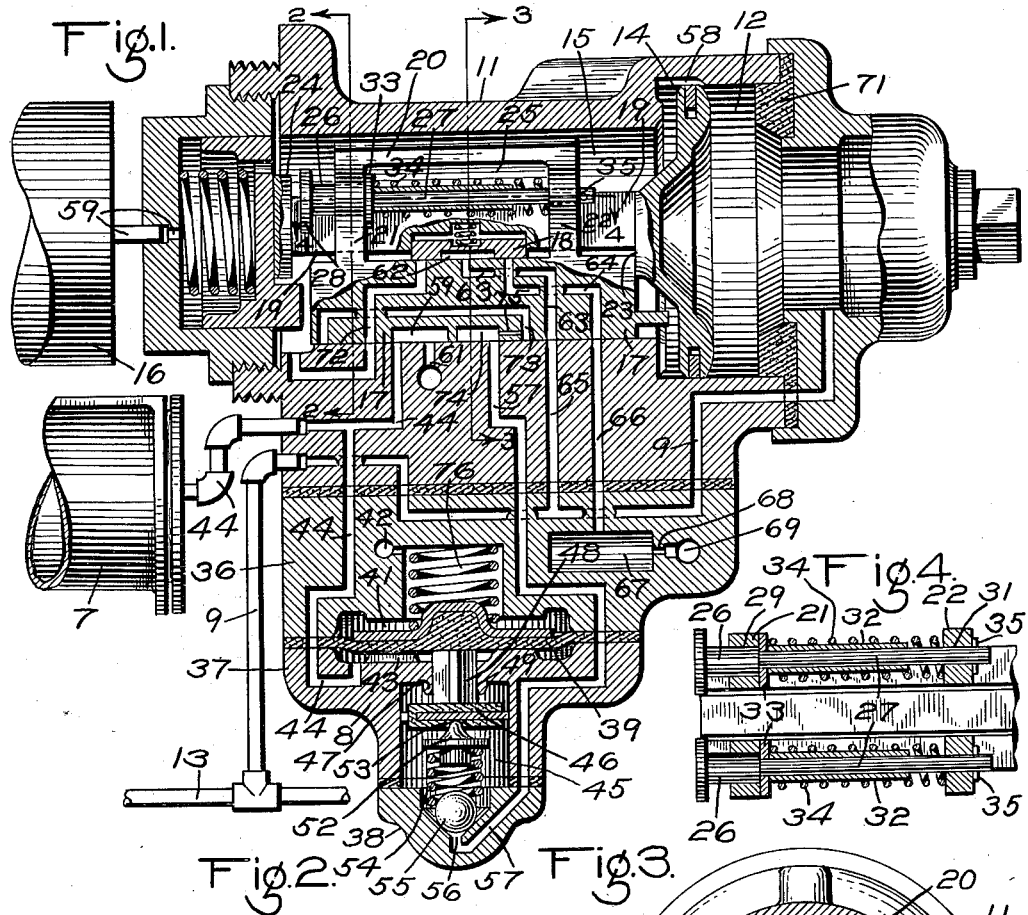
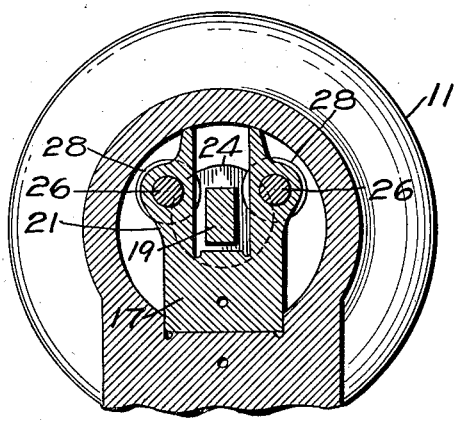
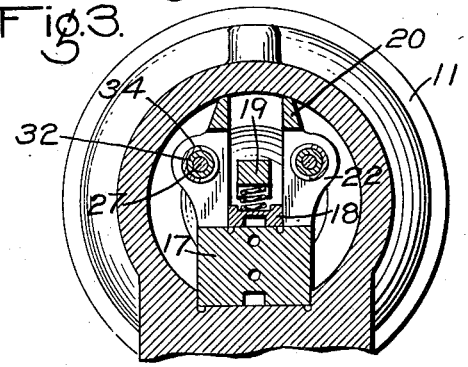
*INVENTOR.*
ELLIS E. HEWITT
By
*ATTORNEY.*

Patented July 21, 1936

2,048,337

UNITED STATES PATENT OFFICE 2,048,337

FLUID PRESSURE BRAKE

Ellis E. Hewitt, Edgewood, Pa., assignor to The Westinghouse Air Brake Company, Wilmerding, Pa., a corporation of Pennsylvania Application April 6, 1932, Serial No. 603,508

9 Claims. (Cl. 303—1)

This invention relates to fluid pressure brakes of the well known automatic type in which the brakes are applied by effecting a reduction in brake pipe pressure and are released by effecting an increase in brake pipe pressure.

In the copending applications of Clyde C. Farmer, Serial Nos. 473,323 and 553,064, filed respectively August 6, 1930, and July 25, 1931, and assigned to the assignee of this application, triple valve devices are disclosed wherein yielding resilient means are associated with the main slide valve of the triple valve device in such manner that after the piston and graduating valve moves upon a light reduction in brake pipe pressure to close the usual feed groove, said means so act on the piston as to require a further and predetermined reduction in brake pipe pressure for causing said piston to move the usual graduating valve to quick service position.

It is an object of this invention to provide a quick service spring mechanism of the general type disclosed in the above noted application, Serial No. 553,064, and wherein the guide wings of the main slide valve of the triple valve device are provided with bearing openings and serve to slidably support quick service spring mechanism with the springs thereof mounted between the spaced wings, thereby providing a compact structure that may readily be assembled within the valve seat bushing without necessitating alteration thereof.

A further object of the invention is to provide a quick service spring mechanism wherein the number of parts is reduced to a minimum, thereby reducing the manufacturing cost and simplifying the assembly of the mechanism.

In the above noted patent applications, there is provided a quick service modifying valve device comprising a valve for controlling communication through which fluid under pressure is vented from the brake pipe to the brake cylinder to effect a local quick service reduction in brake pipe pressure and a diaphragm operated upon a predetermined increase in brake cylinder pressure to permit said valve to be moved to its seat by a spring, so as to cut off the further venting of fluid from the brake pipe. There is also provided a check valve which is urged to its seat by a spring and which operates to prevent possible back flow from the brake cylinder through said brake pipe venting communication.

Another object of my invention is to provide a simplified quick service modifying and check valve construction, in which the modifying valve and the check valve are so associated, that a single spring is utilized to urge both valves to their respective seats.

These and other objects that will be made apparent throughout the further description of the invention, are attained by means of the triple valve construction hereinafter described and illustrated in the accompanying drawing; wherein Fig. 1 is a sectional view, partially in elevation, of a triple valve device embodying features of the invention;

Figs. 2 and 3 are transverse sectional views of a fragment of the apparatus shown in Fig. 1, the sections being taken respectively on the lines 2—2 and 3—3 of Fig. 1; and Fig. 4 is a longitudinal section through the quick service mechanism taken on line 4—4 of Fig. 1.

Referring to the drawing, the triple valve device 11 may comprise a casing having a piston chamber 12, connected to the brake pipe 13 through passage and pipe 9 and containing a piston 14, and having a valve chamber 15, connected to the auxiliary reservoir 16, and containing a main slide valve 17 and an auxiliary or graduating slide valve 18, mounted on and having a movement relative to the main slide valve, said valve being operated by the piston through a piston stem 19, which is mounted between two rows of guide members or wings 21 and 22 that are integrally mounted on the main slide valve and which serve as guides for the graduating valve 18. The guide wings 21 and 22 on the same side of the main slide valve are integrally connected by a bridge member 20.

The main slide valve 17 is disposed between a stop shoulder 23 on the stem 19 and a stop flange 24 on the end of the stem, and the shoulder 23 and flange 24 are so spaced that the stem may be moved relatively with respect to the main slide valve. The graduating valve 18 is so connected to the stem 19 that it moves with the stem and may lap and uncover ports in the main slide valve as will hereinafter appear.

For a purpose that will hereinafter be made apparent, the main slide valve is provided with a quick service spring mechanism 25, adapted to yieldingly oppose relative movement of the piston and stem with respect to the main slide valve after the piston has moved a slight distance from release position. The device 25 may comprise a pair of plungers 26, each having a stem 27 of smaller diameter than the body of the plunger, and an end flange 28, the plunger and stem being slidably mounted in bores 29 and 31 in the guide wings 21 and 22 respectively, as clearly indicated in Fig. 4. A tubular bushing 32 surrounds the stem 27 and is provided at one end with a flange 33 that is normally biased in engagement with the wing 21 by a spring 34 that surrounds the bushing 32 and which is disposed between the flange 33 and the wing 22. Each plunger is retained in assembled position as shown in Fig. 4 by a pin 35 which extends through a hole in the extreme end of the stem 27.

As shown in Fig. 1, the plungers 26 are biased in their extreme left positions with respect to the main slide valve by the springs 34 and with the triple valve device in the full release position shown in Fig. 1, the flange 24 of the stem 19 is spaced a slight distance from the end flanges 28 of the plungers 26. When the piston 14 is moved to the right a slight distance toward service application position, the flange 24 on the end of the stem 19 engages the flanges 28 on the plungers and further movement of the piston 14 to the right is yieldingly opposed by the springs 34 for a purpose that will be hereinafter made apparent.

The triple valve device may further comprise a quick service modifying valve device 8 comprising casing sections 36, 37, and 38, which may be secured together by any desired means, the section 36 being connected to the body of the triple valve device. Clamped between the casing sections 36 and 37 is a flexible diaphragm 39 having at one side a chamber 41 which is open to the atmosphere through a port 42 and having at the other side a chamber 43 which is open to the brake cylinder 7 through a brake cylinder passage and pipe 44. Contained in a chamber 45, formed in the casing section 37 and having its open end closed by casing section 38, is a quick service modifying valve 46 which is slidably mounted in the chamber 45 and which is adapted to be moved into sealing engagement with an annular seat rib 47. This valve is provided with a fluted stem 48 which extends through the bore 49 and engages with one side of the flexible diaphragm 39. The end of the stem is maintained in engagement with the diaphragm by the action of a mechanism comprising a member 52 having a cone-shaped portion which has a point contact with one side of the valve 46 within a recess 53 formed in the valve, and also comprises a spring 54 which is interposed between and engages the member 52 and a ball check valve 55 that is mounted in the chamber 45 and which serves to prevent back flow from chamber 45 to a passage 57 leading to the seat of the main slide valve 17. It will here be noted that the single spring 54 serves to yieldingly urge both the modifying valve 46 and the ball check valve 55 to their respective seats.

In operation, to initially charge the brake equipment, fluid under pressure is supplied to the brake pipe 13 in the usual manner and from thence flows to the triple valve piston chamber 12. With the triple valve piston 14 in full release position, as shown in Fig. 1, fluid flows from the chamber 12 through a feed groove 58 to valve chamber 15, and from thence through passage and pipe 59 to the auxiliary reservoir 16, thereby charging the valve chamber 15 and the auxiliary reservoir 16 to brake pipe pressure.

With the main triple valve 17 and graduating valve 18 in the full release position as shown in Fig. 1, the brake cylinder is connected to the atmosphere in the usual manner through pipe and passage 44, the usual exhaust cavity 59 in the main slide valve 17 and the atmospheric passage 61.

With the triple valve piston 14 and slide valves 17 and 18 in the full release position as shown in Fig. 1, in which shoulder 23 on the piston 14 engages the end of the main slide valve 17, it will be noted that the flanges 28 of the plungers 26 are spaced away from the end or stop flange 24 on the stem 19.

If it is desired to effect a service application of the brakes, a gradual reduction in brake pipe pressure is effected in the usual manner by operation of the usual brake valve device (not shown). When the brake pipe pressure in piston chamber 12 is thus reduced below auxiliary reservoir pressure present in valve chamber 15, the piston 14 initially moves to the right and closes the feed groove 58. This movement of the piston 14 moves the graduating valve 18 relative to the main slide valve 17 and at substantially the same time as the feed groove is closed, the flange 24 on the end of the stem 19 engages the outer ends of the plungers 26. Further movement of the piston 14 is then yieldingly opposed by the springs 34, but when the brake pipe pressure is reduced a predetermined but slight amount, for example, a reduction of 1 pound, the resistance of the springs 34 is overcome, permitting the piston 14 to move the graduating valve 18 to quick service position, without moving the main slide valve 19 from the full release position.

In the quick service position of the graduating valve 18, the cavity 62 connects ports 63 and 64 in the main slide valve 17. In full release position of the main slide valve 17, port 63 registers with the passage 65 connected to the passage 9 that is connected to the brake pipe 13, and the port 64 in the main slide valve 17 registers with the passage 66 connected to a quick service bulb 67 which is open to the atmosphere through a restricted passage 68 and atmospheric passage 69.

In the quick service position of the main and graduating slide valves, fluid under pressure flows from the brake pipe 13 to the quick service bulb 67 through pipe and passage 9, passage 65, port 63 in the main slide valve 17, cavity 62 in the graduating slide valve 18, port 64 in the main slide valve 17 and passage 66. The flow of fluid under pressure from the brake pipe to the bulb and from thence to the atmosphere causes the pressure in the brake pipe to reduce at such a rate as to ensure movement of the triple valve device on the next succeeding car to quick service position. In this manner, quick service action is serially propagated throughout the equipment of the cars of the train.

When the brake pipe pressure is reduced by operation of the brake valve device and the local quick service venting of fluid under pressure from the brake pipe, the triple valve piston 14 and slide valves 17 and 18 are positively moved to service position on each car, in which position the piston 14 engages a sealing gasket 71 and a service port 72, in the main slide valve, registers with the brake cylinder passage 44. The service port 72 is uncovered by the movement of the graduating valve 18 to quick service position, so that in service position of the main slide valve 17, fluid under pressure flows from the valve chamber 15 and the connected auxiliary reservoir 16 through port 72 and passage and pipe 44 to the brake cylinder 7, to effect an application of the brakes.

With the main slide valve and the graduating slide valve in service position, port 73 in the main slide valve registers with the passage 65, and cavity 74, which is connected to the port 73 by a restricted passage 75, registers with the passage 57. With the said valves in service position, fluid under pressure flows from the brake pipe to the brake cylinder 7 through passage and pipe 9, passage 65, port 73 in the main slide valve, restricted passage 75, cavity 74, passage 57, port 56 past the ball check valve 55, chamber 45 past the valve 46 through bore 49, chamber 43, and passage and pipe 44.

Fluid under pressure continues to flow from the brake pipe to the brake cylinder through the communication above described until the pressure within the brake cylinder attains a predetermined value, say 10 pounds, when the pressure in the chamber 43 of the modifying valve device 8 on the under side of the diaphragm 39, overcomes the pressure of the spring 76 and forces the diaphragm 39 upward, thus permitting the valve 46 to close, and prevents further quick service local venting of fluid from the brake pipe.

The ball check valve 55 is provided to prevent a back flow of fluid from the brake cylinder, should the brake pipe pressure fall below that of the brake cylinder, and it will be noted that in the improved construction disclosed, the spring 54 serves to yieldingly bias both the ball check valve 55 and the valve 46 in closed position. By reason of this construction, the modifying valve device 8 and check valve device are so combined as to afford a simple, compact and inexpensive construction.

To release the brakes, the brake pipe pressure is increased in the usual well known manner, and when the pressure in the piston chamber 12 exceeds that in the valve chamber 15 and the auxiliary reservoir 16, the piston 14 is moved to the left to the release position as shown in Fig. 1, wherein the brake cylinder 7 is open to the atmosphere and fluid under pressure flows from the brake pipe through the feed groove 58, to valve chamber 15 and to the auxiliary reservoir 16 through passage and pipe 59.

While I have disclosed but one embodiment of the invention, it is obvious that many changes, omissions and additions may be made in the construction without departing from the spirit of the invention.

Having now described my invention, what I claim as new and desire to secure by Letters Patent, is:

1. In a triple valve device, the combination with a piston having a stem, a main valve and a graduating valve operated by the stem and cooperating with said main valve, of a pair of spaced guide members carried by said main valve and having bearing openings therein, and a yielding resistance means comprising a plunger mounted in said bearing openings, a spring disposed between said guide members for biasing the said plunger in one direction and means on the stem for engaging said plunger upon a predetermined movement of the stem with respect to the said main valve, the said spring being adapted through the plunger to yieldingly oppose movement of the stem with respect to the said main valve.

2. In a triple valve device, the combination with a piston having a stem, a main valve and a graduating valve operated by the stem and cooperating with said main valve, of a pair of spaced guide members carried by said main valve and having bearing openings therein, and a yielding resistance means comprising a plunger mounted in said bearing openings and having a large portion and a reduced portion, a flanged sleeve slidably mounted on the said reduced portion of the plunger between said guide members, a spring surrounding the sleeve and disposed between a guide member and the flange of the sleeve for yieldingly biasing the said sleeve into engagement with the said large portion of the plunger, and means on said stem for engaging said plunger upon a predetermined movement of the stem with respect to said main valve, said spring being adapted through said sleeve and said plunger to yieldingly oppose movement of the stem with respect to said main valve.

3. In a triple valve device, the combination with a piston having a stem, a main valve and a graduating valve operated by the stem and cooperating with said main valve, of a pair of spaced guide members carried by said main valve and having bearing openings therein, and a yielding resistance means comprising a plunger mounted in said bearing openings and having a stop shoulder thereon, a sleeve slidably mounted on the said plunger for movement between said guide members, a spring surrounding said plunger and disposed between a guide member and a portion of said sleeve for yieldingly biasing the sleeve into engagement with the other guide member and said stop shoulder, and means on said stem for engaging the said plunger upon a predetermined movement of the stem with respect to the said main valve, the said spring being adapted through said sleeve and said plunger to yieldingly oppose movement of said stem with respect to said main valve.

4. In a fluid pressure brake, the combination with a brake pipe, a brake cylinder and a triple valve device operated upon a reduction in brake pipe pressure for supplying fluid under pressure to the brake cylinder and for venting fluid from the brake pipe to the brake cylinder, of a valve for controlling communication through which said triple valve device vents fluid from the brake pipe to the brake cylinder, a movable abutment operated upon a predetermined increase in brake cylinder pressure to permit said valve to move to a seat for closing said communication, a check valve for preventing flow from the brake cylinder through said communication to the brake pipe, and a spring interposed between said valves for urging both valves to their closed positions.

5. In a fluid pressure brake, the combination with a brake pipe, a reservoir, a brake cylinder and a triple valve device operative upon a reduction in brake pipe pressure to establish a communication from the reservoir to the said brake cylinder and a communication from the brake pipe to said cylinder, a valve in the last said communication, a spring means for normally yieldingly holding the valve open, a pressure operated means for rendering the spring ineffective to retain the valve in open position, a second valve in the last said communication for normally preventing flow of fluid under pressure from the brake cylinder to the brake pipe, and a spring for biasing both valves toward closed position.

6. In a fluid pressure brake, the combination with a brake pipe, a reservoir, a brake cylinder and a triple valve device operative upon a reduction in brake pipe pressure to establish a communication from the reservoir to the said brake cylinder and a communication from the brake pipe to said cylinder, a valve in the last said communication, a spring means for normally yieldingly holding the valve open, a pressure operated means for rendering the spring ineffective to retain the valve in open position and to permit closure of the said valve when the brake cylinder pressure attains a predetermined value, a second valve in the last said communication for normally preventing flow of fluid under pressure from the brake cylinder to the brake pipe, and a spring for biasing both valves toward closed position adapted to be overcome by said first spring.

7. A valve structure including a pair of separate oppositely disposed stationary valve seats, a separate valve for each seat, the said valves being movable in opposite directions to closed position upon their respective seats, a single spring interposed between said valves for yieldingly biasing said valves in opposite directions toward closed position, a second spring for normally yieldingly retaining one of said valves in open position against the action of said first spring, and a fluid pressure actuated means adapted to nullify the action of the said second spring to permit said first spring to move said one of said valves to closed position.

8. A valve structure including a pair of separate oppositely disposed stationary valve seats, a separate valve for each seat, the said valves being movable in opposite directions to closed position upon their respective seats, a single spring interposed between said valves for yieldingly biasing said valves in opposite directions toward closed position, a second spring for normally yieldingly retaining one of said valves in open position against the action of said first spring, and a fluid pressure actuated means adapted to oppose the biasing force exerted by said second spring on said one valve to permit said first spring to move said one valve to closed position.

9. A valve structure including a pair of separate oppositely disposed stationary valve seats, a separate valve for each seat, the said valves being movable in opposite directions to closed position upon their respective seats, a single spring interposed between said valves for yieldingly biasing said valves in opposite directions toward closed position, a movable abutment, a spring for normally biasing said abutment in one direction to a position to operatively engage and maintain one of said valves in open position, said abutment being subject to fluid pressure which opposes the force exerted by the said spring on said abutment and being movable under the force of the fluid pressure to a position out of operative engagement with said one valve to permit said one valve to be moved into its closed position.

ELLIS E. HEWITT.